(12) United States Patent
Svensson et al.

(10) Patent No.: US 12,193,424 B2
(45) Date of Patent: Jan. 14, 2025

(54) PULL TO TURN LEVER DRAG PRESET KNOB

(71) Applicant: Pure Fishing, Inc., Spirit Lake, IA (US)

(72) Inventors: Patrik Svensson, Asarum (SE); Rolland DiSante, Philadelphia, PA (US)

(73) Assignee: Pure Fishing, Inc., Spirit Lake, IA (US)

( * ) Notice: Subject to any disclaimer, the term of this patent is extended or adjusted under 35 U.S.C. 154(b) by 63 days.

(21) Appl. No.: 17/995,522

(22) PCT Filed: Apr. 6, 2021

(86) PCT No.: PCT/US2021/025924
§ 371 (c)(1),
(2) Date: Oct. 5, 2022

(87) PCT Pub. No.: WO2021/207163
PCT Pub. Date: Oct. 14, 2021

(65) Prior Publication Data
US 2023/0189777 A1 Jun. 22, 2023

Related U.S. Application Data

(60) Provisional application No. 63/005,714, filed on Apr. 6, 2020.

(51) Int. Cl.
*A01K 89/01* (2006.01)
*A01K 89/00* (2006.01)
*A01K 89/015* (2006.01)

(52) U.S. Cl.
CPC ........ *A01K 89/0183* (2015.05); *A01K 89/006* (2013.01)

(58) Field of Classification Search
CPC .. A01K 89/0182; A01K 89/045; A01K 89/05; A01K 89/058; A01K 89/059; A01K 89/028; A01K 89/03
See application file for complete search history.

(56) References Cited

U.S. PATENT DOCUMENTS

| | | | |
|---|---|---|---|
| 5,407,144 A * | 4/1995 | Ryall | A01K 89/033 242/301 |
| 6,364,228 B1 | 4/2002 | Datcuk, Jr. | |
| 6,827,306 B1 * | 12/2004 | Datcuk, Jr. | A01K 89/033 242/306 |
| 7,344,099 B1 * | 3/2008 | Ivie | A01K 89/027 242/246 |

(Continued)

FOREIGN PATENT DOCUMENTS

| | | | | |
|---|---|---|---|---|
| CN | 1227711 A | * | 9/1999 | A01K 89/0111 |
| CN | 1537423 A | * | 10/2004 | A01K 89/01 |

(Continued)

*Primary Examiner* — Emmanuel M Marcelo
(74) *Attorney, Agent, or Firm* — Husch Blackwell LLP

(57) ABSTRACT

A preset knob is provided that is not subject to rotation during normal operation of a drag lever used in association with fishing reels having adjustable drag settings. In order to rotate the preset knob in order to adjust its drag settings, it first must be pulled outwardly. As such, when the reel is in use, the preset knob cannot be accidently adjusted by an angler operating the drag lever.

19 Claims, 4 Drawing Sheets

(56) References Cited

U.S. PATENT DOCUMENTS

| | | |
|---|---|---|
| 7,654,483 B1 | 2/2010 | Martin |
| 2002/0104912 A1 | 8/2002 | Bascue, Jr. |
| 2013/0200194 A1* | 8/2013 | Lawson ................. A01K 89/05 |
| | | 242/268 |
| 2019/0230908 A1* | 8/2019 | Saito ................ A01K 89/01121 |

FOREIGN PATENT DOCUMENTS

| | | | | |
|---|---|---|---|---|
| JP | 59023966 U | | 2/1984 | |
| JP | 08131027 A | | 5/1996 | |
| JP | H09119 A | * | 1/1997 | ............. A01K 89/01 |
| JP | H11239437 A | * | 9/1999 | ......... A01K 89/0111 |
| KR | 2019990034121 U | | 8/1999 | |

* cited by examiner

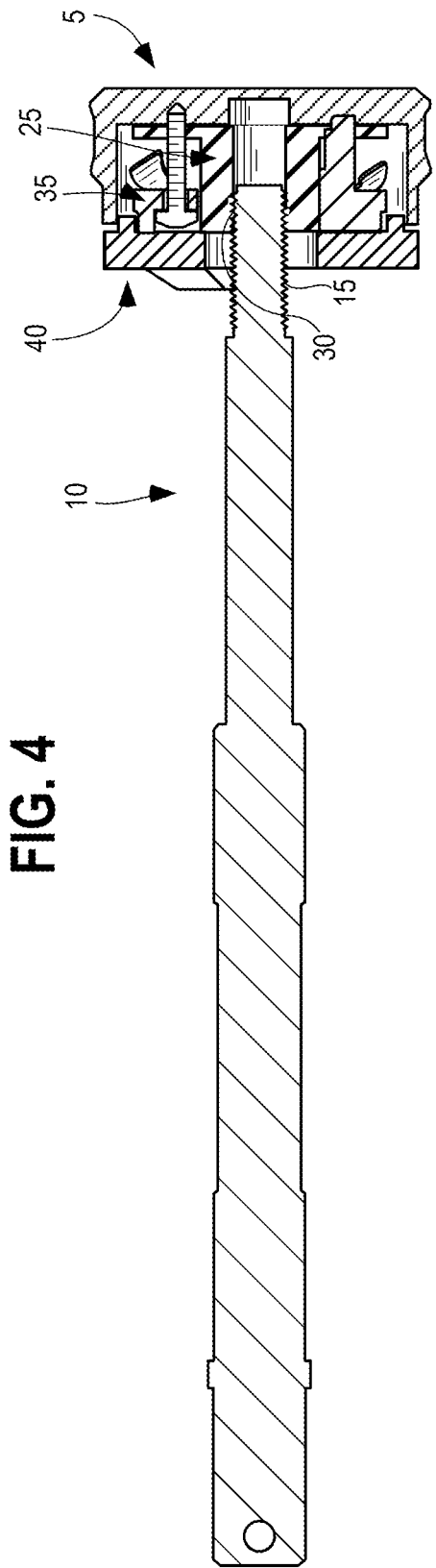
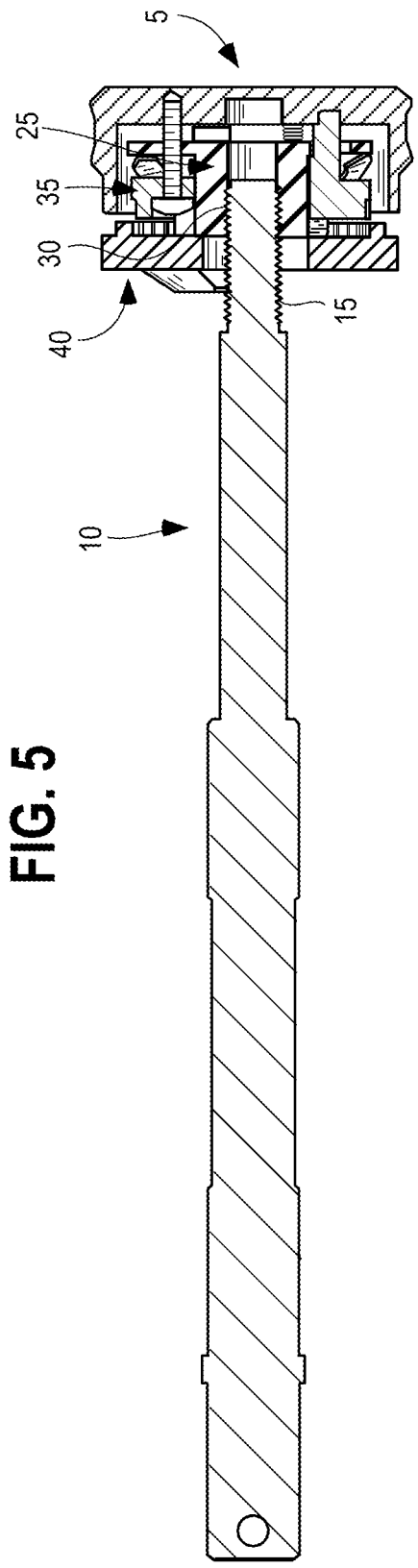

PULL TO TURN LEVER DRAG PRESET KNOB

CROSS-REFERENCE TO RELATED APPLICATIONS

This application is a U.S. National Phase Application of International Application No. PCT/US2021/025924 filed on Apr. 6, 2021, which claims the benefit of priority from U.S. Provisional Patent Application Ser. No. 63/005,714, filed on Apr. 6, 2020. The disclosures of PCT/US2021/025924 and 63/005,714 are incorporated herein by reference.

BACKGROUND OF THE INVENTION

The drag function on fishing reels primarily allows fish to pull line from the reel when the line becomes too tight to support the strength and the weight of the fish. By allowing the fish to pull line from the reel while under tension, the drag functionality alleviates pressures on the line, the rod, and the angler.

Secondarily, a drag system induces a fish to wear itself out. Every time a fish pulls line against the drag, the fish further exhausts its energy. With each successive run against the drag, a fish becomes more and more fatigued, which increases the likelihood that an angler may land the fish.

Some conventional reels use what is called a star drag system, but many conventional reels utilize a lever drag system. The lever drag system uses a sliding lever mounted on the reel to make drag adjustments. Internally, traditional lever drag systems work by applying a drag plate directly against the side of the line spool. Pressure against the spool creates friction which in turn applies drag to the spool. As a result, when a fish pulls against the drag hard enough, the spool slips and lets line loosen from the spool.

In drag levers, when the drag lever is pushed forward, the drag plate is moved up against the side of the spool. The further the lever is pushed forward, the greater the pressure the drag plate applies against the spool. By pulling the drag lever back, the tension is relieved. When the lever is pulled all of the way back, the reel will go into complete free spool.

In lever drag systems, a rotatable preset knob is often used to calibrate the drag lever settings. More particularly, the knob may be preset such that certain locations correspond to certain drag settings. A user may, for example, have a customized "free spool," "strike," and "full" setting. Unfortunately, this leads to a problem known as "drag drift" where the preset knob changes its position (and thus the settings of the drag lever) as the drag lever is operated over time while fishing, leading to undesired changes in the drag settings. Some reels include a "push to turn" mechanism where the lever will not turn unless the knob is pushed in, but such a design does not work on a "pull-style" lever drag reel such as those known and understood in the art.

Others include a ratcheting function, where the preset knob is ratcheted, to reduce the drag drift issue, but it is a sensitive solution. If tension is too high, it is difficult to turn the preset knob. If it is too loose, the drag drift issue is still present.

SUMMARY OF THE INVENTION

The present invention solves the problem presented by prior art lever drag reels relating to drag drift. More particularly, the present invention improves upon the prior art by providing a preset knob that is not subject to rotation during normal operation of the drag lever. In the present invention, in order to adjust the preset knob, it first must be pulled outwardly (as opposed to, for example, pushed inwardly). As such, when the reel is in use, the preset knob cannot be accidently adjusted, and thus is not prone to drag drift.

BRIEF DESCRIPTION OF THE DRAWINGS

For a better understanding of the present invention, reference may be made to the following accompanying drawings.

FIG. 4 is a cross-section view of the present knob of FIGS. 1-3 in a locked position.

FIG. 5 is a cross-section view of the present knob of FIGS. 1-4 in an unlocked position.

DETAILED DESCRIPTION OF THE INVENTION

Figure 1:
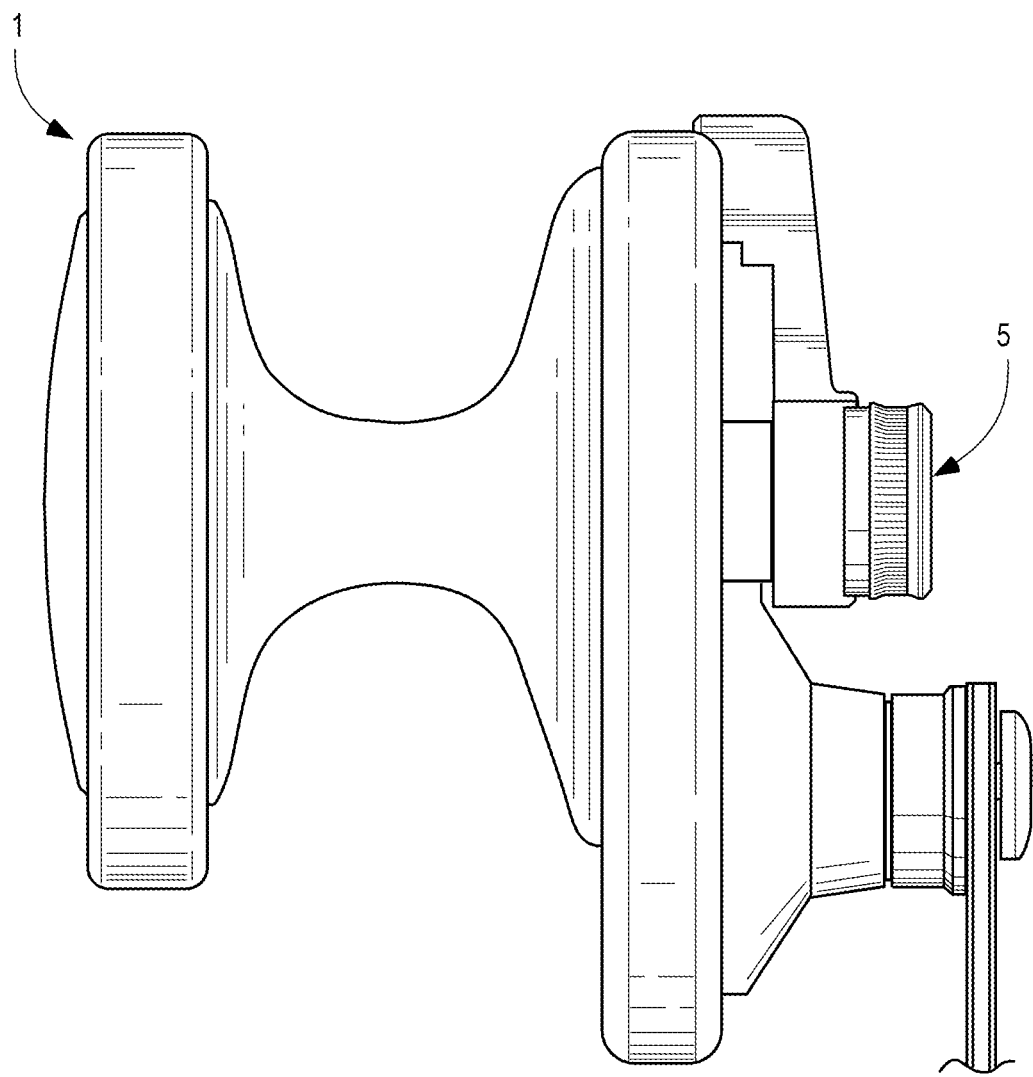
FIG. 1 is an elevation view of a reel including a pull to turn preset knob constructed according to the teachings hereof.

Turning to FIG. 1, a fishing reel 1 that may be constructed substantially similar to fishing reels known and understood in the art is illustrated. Unlike other fishing reels, however, the fishing reel 1 includes a preset knob 5 that an angler must pull in order to turn and subsequently adjust the reel's drag settings.

Figure 2:
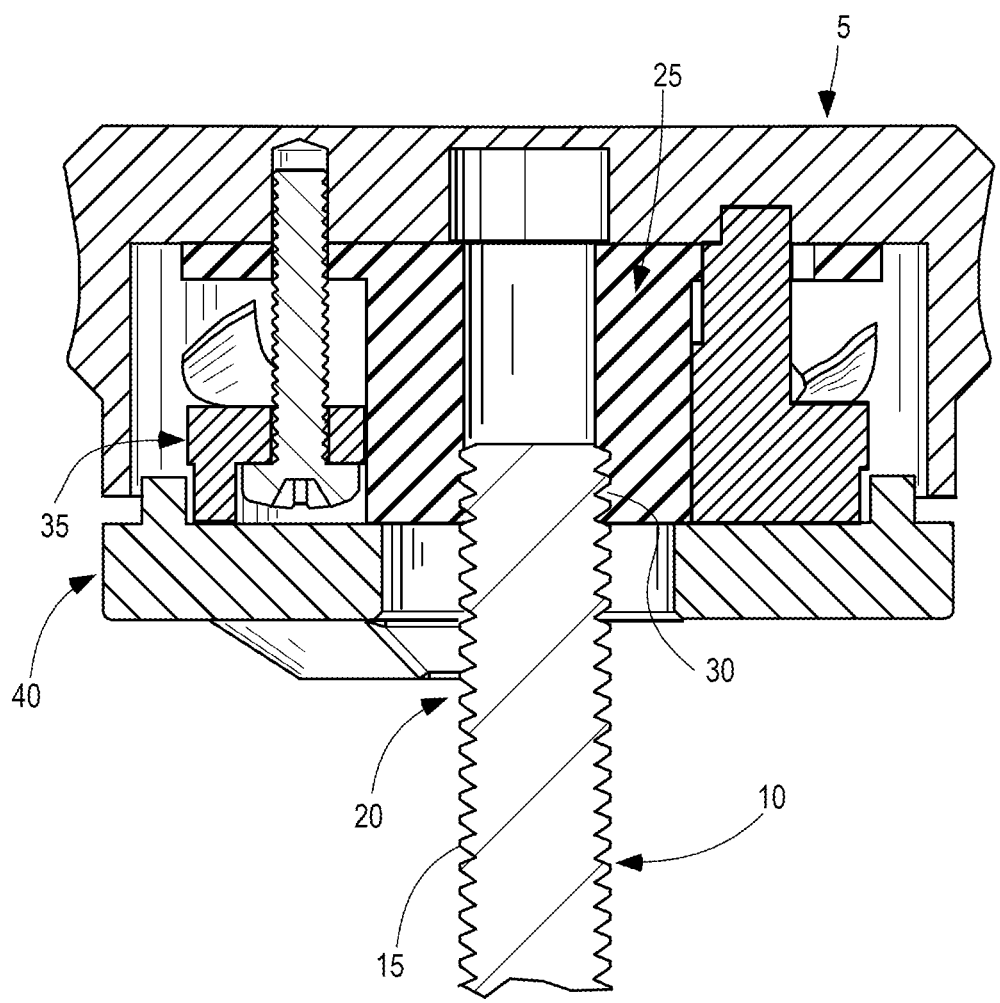
FIG. 2 is a cross section of the preset knob of FIG. 1.

As illustrated in FIG. 2, the preset knob 5 preferably includes a shaft member 10 that includes a plurality of threads 15 at a distal portion 20 thereof. The shaft 10 may move axially via rotation of a preset nut 25 that includes internal threads 30. The internal threads 30 and the threads 15 of the shaft 10 may be sized and shaped to be compatible with one another in a known manner.

When the preset knob 5 is unlocked in the manner described below, the preset nut 25 acts on the shaft 10. More particularly, in the illustrated embodiment, when the preset nut 25 is rotated in a clockwise direction, the shaft 10 moves closer to the knob 5. On the other hand, when the preset nut 25 is rotated in a counter-clockwise direction, the shaft 10 may axially translate toward the reel 1. This axial movement of the shaft 10 may act to decrease or increase drag in the reel 1 in a known manner by acting on internal drag components of the reel like those described in the prior art. In the illustrations hereof, the internal drag components are not illustrated for the sake of simplicity.

In order to prevent the preset nut 25 from acting on the shaft 10 without an affirmative step taken by the angler, the knob 5 is not rotatable when it is in the closed position. More particularly, a lock member 35 is preferably provided that is keyed to a cam follower assembly 40 through which the shaft 10 may extend.

Figure 3:
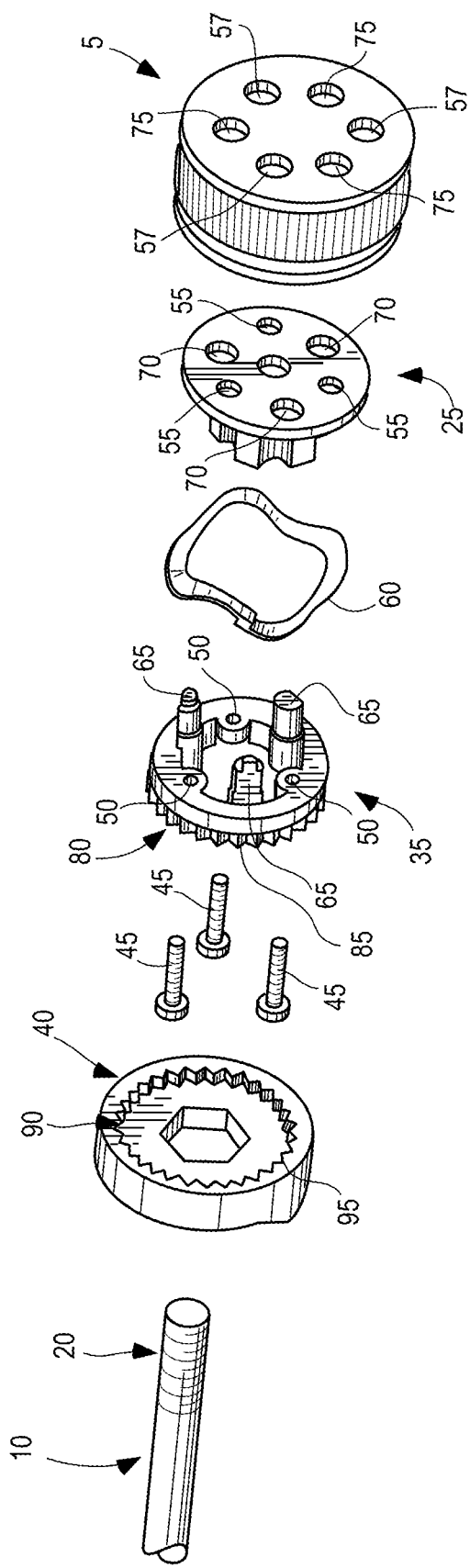
FIG. 3 is an exploded view of the preset knob of FIG. 2.

More details regarding the lock member 35 and the cam follower assembly 40 are illustrated in FIG. 3. A plurality screw members 45 may be threaded into the lock member 35 via holes 50 in the lock member 35, holes 55 in the preset nut 25, and holes 57 in the knob 5 in order to secure the knob 5 to the nut 25 and the lock member 35. In embodiment illustrated in FIG. 3, three screw members 45 are provided, but in alternative embodiments, more or fewer screw members 45 may be provided. A wave spring 60 is preferably provided between the preset nut 25 and the lock member 35 in order to help to keep the lock member 35 engaged with the cam follower assembly 40 when the knob 5 is in its locked position by applying a spring force thereto. Other spring types are also foreseeable, as recognized by those skilled in the art.

Near the knob 5, the lock member 35 includes a plurality of projections 65 that project toward the knob 5. The projections 65 preferably align with a second set of holes 70 provided in the preset nut 25 as well as a second set of holes 75 provided in the knob 5. The projections 65 (of which the illustrated embodiment includes three) may be received within the holes 70 and 75 to further secure the lock member 35, preset nut 25, and knob 5 to one another.

An outer perimeter 80 of the lock member 35 preferably includes a plurality of teeth 85 that project outwardly from the outer perimeter 80. An internal circumference 90 of the cam follower assembly 40 also preferably includes a plurality of teeth 95 that project inwardly therefrom. In operation, when the knob 5 is in its closed position, the teeth 85 and 95 align and are keyed to one another and fit with one another such that the knob 5 is not rotatable. In alternative embodiments, the lock member 35 and the cam follower assembly 40 may be keyed to one another using an alternative mechanism.

Turning now to FIG. 4, the knob 5 is illustrated in its closed position. In this position, the knob 5 is not rotatable because the lock member 35 has been keyed to the cam follower assembly 40 (via the teeth 85 and 95, which are not illustrated in FIG. 4) such that the knob 5, preset nut 25 and the lock member 35 may not rotate, and thus the shaft 10 is similarly not rotatable.

Turning to FIG. 5, the knob 5 has been pulled outwardly so as to disengage the teeth 85 and 95 (not illustrated) from one another, thus making the knob 5, preset nut 25, and lock member 35 rotatable relative to the cam follower assembly 40. Because the shaft 10 is engaged with the preset nut 25 via the threads 15, 30, respectively, when the knob 5 is rotated, the threads 15, 30 may act to pull the shaft 10 outwardly, or push the shaft 10 inwardly. As provided above, preferably, when the knob 5 is rotated in a counter-clockwise direction, the shaft 10 may translate inwardly toward the reel 1, while if the preset nut 25 is rotated in a clockwise direction, the shaft 10 may translate axially outwardly toward the knob 5. In operation, movement of the shaft 10 may cause internal drag mechanisms within the reel 1 to carry out particular functions and thus change the drag settings in a known and understood manner.

From the foregoing, it will be seen that the various embodiments of the present invention are well adapted to attain all the objectives and advantages hereinabove set forth together with still other advantages which are obvious and which are inherent to the present structures. It will be understood that certain features and sub-combinations of the present embodiments are of utility and may be employed without reference to other features and sub-combinations. Since many possible embodiments of the present invention may be made without departing from the spirit and scope of the present invention, it is also to be understood that all disclosures herein set forth or illustrated in the accompanying drawings are to be interpreted as illustrative only and not limiting. The various constructions described above and illustrated in the drawings are presented by way of example only and are not intended to limit the concepts, principles, and scope of the present invention.

Many changes, modifications, variations, and other uses and applications of the present invention will, however, become apparent to those skilled in the art after considering the specification and the accompanying drawings. All such changes, modifications, variations, and other uses and applications which do not depart from the spirit and scope of the invention are deemed to be covered by the invention, which is limited only by the claims which follow.

The invention claimed is:

1. A fishing reel having an adjustable drag, the fishing reel comprising:
    a preset knob attached to an outer portion of the fishing reel;
    a shaft having a first end and a second end, wherein the first end is mechanically coupled to the preset knob and the second end is mechanically coupled to a drag assembly;
    wherein when the preset knob is in a first position, the preset knob is not rotatable;
    wherein when the preset knob is in a second position, the preset knob is rotatable; and
    wherein when the preset knob is pulled outwardly from the shaft, the preset knob moves from the first position to the second position.

2. The fishing reel of claim 1, wherein in the first position, the preset knob is nearer to the shaft than in the second position.

3. The fishing reel of claim 1, wherein the fishing reel includes a preset nut that is engaged with the shaft such that more or less of the shaft may be secured within the preset nut.

4. The fishing reel of claim 1, wherein the fishing reel includes a lock member that is engaged with the preset knob.

5. The fishing reel of claim 4, wherein the fishing reel includes a cam follower assembly that is selectively engageable with the lock member.

6. The fishing reel of claim 5, wherein the lock member includes a plurality of teeth members.

7. The fishing reel of claim 6, wherein the cam follower assembly includes a plurality of teeth members.

8. The fishing reel of claim 7, wherein the plurality of teeth members of the cam follower assembly and the plurality of teeth members of the lock member are engaged with one another when the preset knob is in the first position.

9. The fishing reel of claim 1, wherein the fishing reel includes a spring to bias the preset knob in the first position.

10. A fishing reel having an adjustable drag, the fishing reel comprising:
    a preset knob attached to an outer portion of the fishing reel;
    a shaft having a first end and a second end, wherein the first end is mechanically coupled to the preset knob and the second end is mechanically coupled to a drag assembly;
    a lock member that is engaged with the preset knob;
    a cam follower assembly that is selectively engageable with the lock member; and
    wherein when the preset knob is pulled outwardly from the shaft, the lock member and the cam follower assembly disengage from one another.

11. The fishing reel of claim 10, wherein the fishing reel includes a preset nut that is engaged with the shaft such that more or less of the shaft may be secured within the preset nut.

12. The fishing reel of claim 10, wherein in a first position the cam follower assembly is engaged with the lock member, and in a second position, the cam follower assembly is disengaged with the lock member.

13. The fishing reel of claim 12, wherein when the preset knob is in the first position, the preset knob is not rotatable, and wherein when the preset knob is in the second position, the preset knob is rotatable.

14. The fishing reel of claim 10, wherein the lock member includes a plurality of teeth members.

15. The fishing reel of claim 14, wherein the cam follower assembly includes a plurality of teeth members.

16. The fishing reel of claim 15, wherein when the teeth members of the cam follower assembly and the teeth members of the lock member are engaged with one another, the preset knob is not rotatable.

17. The fishing reel of claim 15, wherein when the teeth members of the cam follower assembly and the teeth members of the lock member are disengaged with one another, the preset knob is rotatable.

18. The fishing reel of claim 10, wherein the fishing reel includes a spring to bias the preset knob toward the shaft.

19. The fishing reel of claim 10, wherein when the preset knob is pulled outwardly from the shaft, the preset knob is rotatable.

* * * * *